Aug. 20, 1940.  J. B. McGAY  2,211,755

CONVERTING MEANS

Filed July 18, 1938

Inventor

J. B. McGay

By Barry + Cyr

Attorneys

Patented Aug. 20, 1940

2,211,755

UNITED STATES PATENT OFFICE 2,211,755

CONVERTING MEANS

John B. McGay, Tulsa, Okla.

Application July 18, 1938, Serial No. 219,850

2 Claims. (Cl. 74—421)

This invention relates to an adapter for use with meter clocks or the like.

In many meters of the type employing charts, the chart is caused to complete a revolution only once every seven days. Such meters are provided with a clock having a shaft which makes only one revolution every seven days. The clock employed is of the seven-day variety, and it is wound once a week, and the chart is changed once a week.

Other meters employ a clock-driven shaft for the chart and the shaft makes a complete revolution every twenty-four hours. With such meters a twenty-four hour chart is employed and the clock is wound once a day.

It has been found that it is desirable at many times to use a twenty-four hour chart where a seven-day chart had previously been employed, and conversely to use a meter having a seven-day chart where a twenty-four hour chart had previously been used. In order to accomplish the desired result, a new clock has to be installed in the meter, or two meters used. Therefore, the primary purpose of the present invention is to provide an adapter or converter for the main shaft or arbor so that the chart-supporting hub will make one complete revolution every twenty-four hours or every seven days as may be desired.

The converter or adapter of my invention is not a part of the clock but a separate unitary structure which may be attached to the clock easily at will to change the period of rotation of the chart. This is accomplished without changing the chart or the height of the chart mounting in the instrument case. In other words, chart placement is the same regardless of the period of rotation.

A further object is to supply a converter for such purposes which may be attached to the clock or detached therefrom without the use of tools.

With the foregoing objects outlined and with other objects in view which will appear as the description proceeds, the invention consists in the novel features hereinafter described in detail, illustrated in the accompanying drawing and more particularly pointed out in the appended claims.

Figure 1:
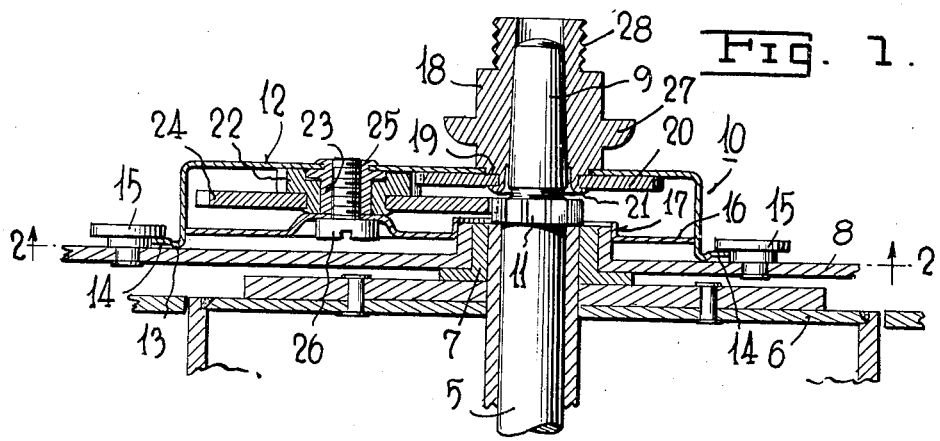
Fig. 1 is a longitudinal sectional view of the adapter shown attached to a clock.
Figure 2:
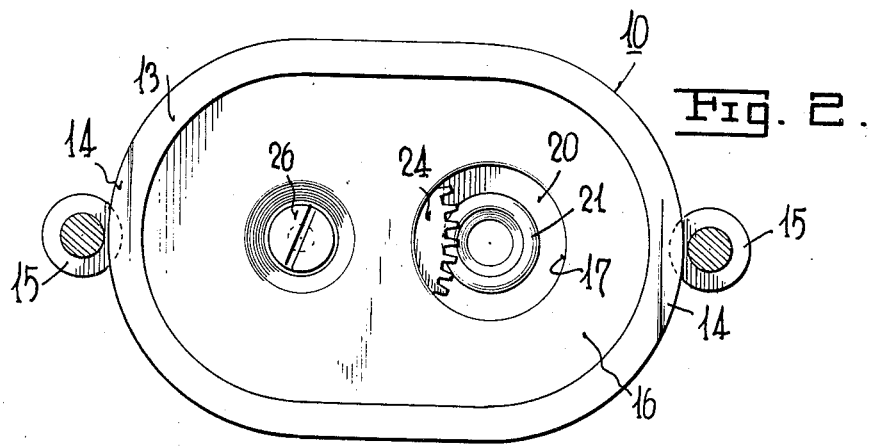
Fig. 2 is an elevation looking from the rear of the adapter.
Figure 3:
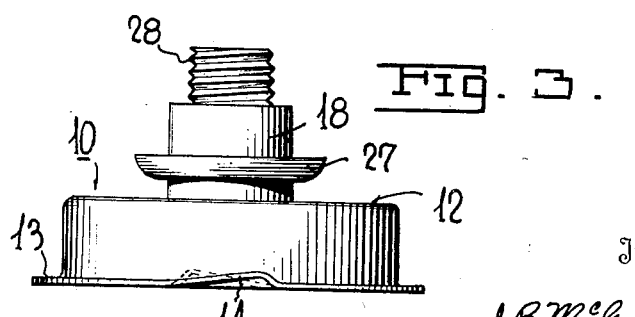
Fig. 3 is an end elevation.

Referring to the drawing, 5 designates the shaft of a clock, a portion of which is shown at 6. In accordance with the present disclosure, the shaft extends through a bushing 7 forming a bearing in the cover 8 of the clock.

For the purpose of the present invention, it will be assumed that the shaft 5 is rotated once every twenty-four hours, and (as is customary) the outer end of the shaft is tapered as shown at 9, to receive a conventional chart-supporting hub (not shown). The chart (not shown) carried by the hub will be rotated a complete revolution only once in twenty-four hours.

In order to convert such an instrument into one which will rotate a chart a complete revolution every seven days, I have devised my unitary adapter 10 and for the purpose of using the adapter, I arrange a spur gear 11 fixedly on the external portion of the shaft. The adapter consists of a relatively shallow metallic casing 12 having a marginal flange 13 that is provided at opposite ends of the casing with cam portions 14 designed to slide under the heads of pins 15 fixed to the clock cover. By this arrangement the casing can be secured to the cover without the use of tools. The rear of the casing is closed by a plate 16 having an inwardly extending annular flange 17 adapted to embrace the boss or bearing portion of the cover 8. The opening formed by the flange is of sufficient size to permit the gear 11 to enter the casing.

A chart hub 18 has a tapered bore to rotatably receive the extremity 9 of the shaft, and the hub has its inner end shaped to provide an annular shoulder 19 against which a gear 20 (arranged in the casing) impinges. The inner end portion of the hub extends through the outer wall of the casing, and is flanged outwardly as shown at 21 in order to clamp the gear 20 fixedly to the hub.

Gear 20 is driven by a smaller gear 22 mounted on a bearing sleeve 23 within the casing. The gear 22 has an extending hub arranged in and fixedly secured to a larger gear 24 driven by the spur gear 11.

The sleeve 23 is part of a rivet which is secured to the outer wall of the casing as indicated at 25, and as the bore of the rivet is screw threaded, such threads are employed to secure the cover plate 16 in position by means of a screw 26 which extends into the casing from the rear of the converter.

In operation, assuming you have an eight-day clock with the main shaft 5 synchronized to complete a revolution only once every twenty-four hours, and you wish to change charts every twenty-four hours, it would be unnecessary, to use the adapter but merely place on the tapered portion of the shaft an individual chart hub for receiving the chart. All such hubs have an annular shoulder 27 serving as an abutment for the chart. Such hubs are also externally threaded as indicated at 28 to receive the cap nut employed to hold the chart in position. As long as it is desired to use one chart every twenty-four hours, the individual type of chart hub is satisfactory but assuming that it is desired to change and use one chart every seven days, then it is necessary to make a change. In accordance with my invention, the individual chart hub is taken off the main shaft 5 and the adapter 10 is placed thereon with the extension 9 extending into the bore of the hub 18. Then the adapter is rotated a quarter of a turn clockwise to cause the cam portions 14 of the margin flange to wedge themselves beneath the heads of the pins 15 so as to secure the adapter casing rigidly to the clock. In such operation the gear 11 is brought into mesh with the gear 24, the ratio between these gears being three and one-half to one. The ratio of the gears 22 and 20 is two to one, and the rotation of gear 20 at the reduced speed of seven to one obviously rotates the chart hub 18 at the desired reduced speed.

It will be understood that the use of the adapter reduces or changes the rotation of the chart hub in such manner that the necessity of changing the clock in a meter for this purpose is eliminated. It will also be understood that by using an eight-day clock with a shaft synchronized to rotate once every twenty-four hours, and with the use of an adapter, you have one meter clock which either rotates the chart hub with one revolution every twenty-four hours or one every seven days as desired.

Obviously the converter may be inserted to render any desired period of rotation.

As to its utility, in some places it is advisable to use twenty-four hour charts during certain periods of the year or during certain seasons, and to use seven-day charts during the remainder of the time. This has been accomplished in the past by removing a twenty-four hour clock and putting in a seven-day clock whenever necessary to make the change. With the converter this will be unnecessary. Also, the inventory of clocks may be decreased due to the fact that one clock serves both purposes. It is also at times necessary to obtain magnified chart readings by rotating the chart once per hour or once every four hours instead of once per day. These magnified readings are used to study plant operation, and have in the past been obtained by changing the whole chart clock. With an adapter according to the invention and comprising proper gearing, such readings may be readily and easily obtained.

While I have disclosed what I now consider to be a preferred embodiment of the invention in such manner that the same may be readily understood by those skilled in the art, I am aware that changes may be made in the details disclosed without departing from the spirit of the invention as expressed in the claims.

What I claim and desire to secure by Letters Patent is:

1. As an article of manufacture, a unitary adapter for use in connection with a horological instrument having a projecting driving shaft with a gear thereon spaced from the end thereof, comprising a relatively shallow casing having oppositely disposed walls, a train of gears arranged in the casing, a hub rotatably mounted on one wall of the casing and adapted to carry a chart, one of the gears of the train being of annular form and fixedly secured to the chart hub concentric with the axis of the latter, said hub having a bore, a hollow rivet secured to one of said walls and having a threaded bore, a second gear of the train being rotatably mounted on said rivet and meshing with said annular gear, a third gear of the train being fixedly secured to said second gear and having a portion of its periphery arranged adjacent to the axis of the first-mentioned bore whereby the projecting end of said driving shaft may be inserted in said bore and the gear on said shaft brought into position to mesh with the third gear of the train, and a threaded member extending through a wall of the casing and engaging the threads of the rivet for securing said walls together.

2. As an article of manufacture, a unitary adapter for use in connection with a horological instrument having a projecting driving shaft with a gear thereon spaced from the end thereof, comprising a relatively shallow casing having oppositely disposed inner and outer walls, a train of gears arranged in the casing, a hub having an abutment for a chart arranged exteriorly of the casing, said hub being rotatively mounted in said outer wall but prevented from axial movement, one of the gears of the train being of annular form and fixedly secured to the chart hub, concentric with the axis of the latter, said hub having a bore, a shaft in the casing secured to said walls, a second gear of the train being rotatably mounted on said shaft and meshing with said annular gear, a third gear of the train being fixedly secured to the second gear by means arranged within the casing and having a portion of its periphery arranged adjacent to the axis of said bore whereby the projecting end of said driving shaft may be passed through said casing and inserted in said bore and the gear on said driving shaft brought into position to mesh with the third gear of the train, the hub being the only portion of the adapter projecting beyond said abutment.

JOHN B. McGAY.